UNITED STATES PATENT OFFICE.

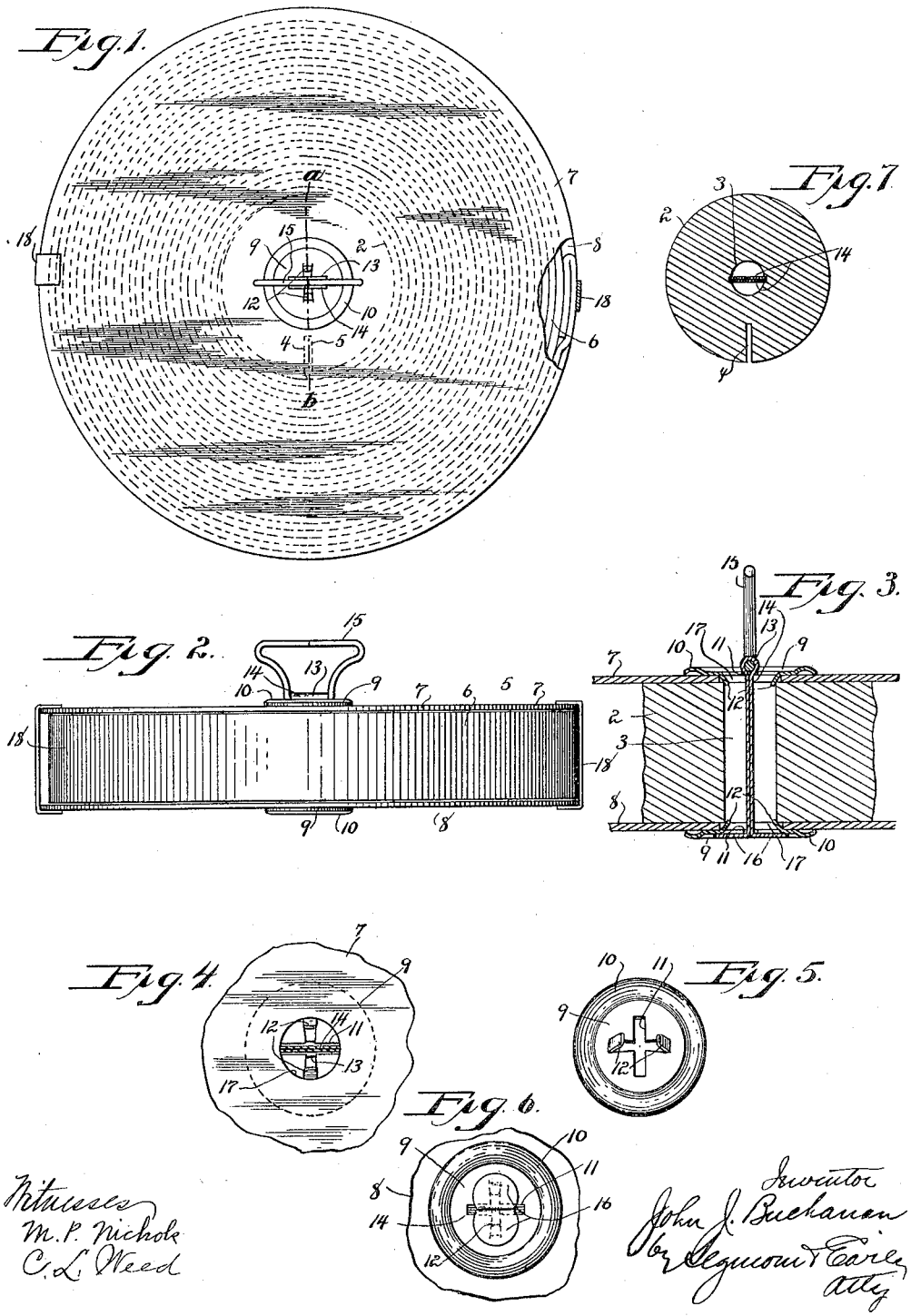

JOHN J. BUCHANAN, OF WATERBURY, CONNECTICUT, ASSIGNOR TO THE NARROW FABRIC CORPORATION, OF ORANGE, CONNECTICUT, A CORPORATION.

REEL FOR STRIP MATERIAL.

1,110,743.  Specification of Letters Patent.  Patented Sept. 15, 1914.

Application filed December 1, 1913. Serial No. 803,934.

*To all whom it may concern:*

Be it known that I, JOHN J. BUCHANAN, a citizen of the United States, residing at Waterbury, in the county of New Haven and State of Connecticut, have invented a new and useful Improvement in Reels for Strip Material; and I do hereby declare the following, when taken in connection with the accompanying drawings, and the characters of reference marked thereon, to be a full, clear, and exact description of the same, and which said drawings constitute part of this application, and represent, in—

Figure 1 a plan view of a reel for strip material constructed in accordance with my invention, a portion of the upper disk being broken away and one of the clips being shown in section. Fig. 2 a view of the reel in side elevation. Fig. 3 an enlarged, broken central sectional view on the line *a—b* of Fig. 1. Fig. 4 a broken inside view of the upper disk looking upward, and showing the handle-strap in transverse section. Fig. 5 a reverse perspective view of one of the centering washers. Fig. 6 a broken reverse plan view of the center of the reel, showing the positioning-washer applied to the outer face of the lower disk and held in place by the lower ends of the handle-strap. Fig. 7 a detached sectional view of the spool, showing the embedding of the edges of the handle-strap at opposite points in the walls of its central opening.

My invention relates to an improvement in the reel for strip material, shown and described in United States Patent No. 1,029,212 granted June 11, 1912, to Roswell A. Moore and A. S. Sutcliffe, the object being to improve the appearance and durability of the said patented reel which is designed, in particular, for use in shipping and retailing narrow elastic webbing, tapes, ribbons, &c.

With these ends in view, my invention consists in a reel for strip material, having certain details of construction and combinations of parts as will be hereinafter described and pointed out in the claim.

In carrying out my invention as herein shown, I employ a spool 2 made of wood or equivalent material having a central hole 3 and a radial slot 4. The said slot 4 provides for the engagement with the spool of the inner end 5 of the strip material 6 which is coiled upon the periphery of the spool as shown in broken lines in Fig. 1. The strip material is confined between and protected by an upper disk 7 and a lower disk 8 preferably made of pasteboard. These disks are respectively applied to the opposite ends of the spool upon which they are centered and held in place by means of two corresponding struck-up positioning-washers 9, each formed with a peripheral band 10, with a central handle-slot 11, and with two inwardly extending inclined centering fingers 12 located opposite each other in a line at a right angle to the length of the said slot. The disks 7 and 8 are held in place against the respective ends of the spool 2 by means of the said washers 9 which are clamped down upon the outer faces of the disks by means of a handle-strap 13 consisting of a piece of sheet-metal folded upon itself and bent midway of its ends to form a loop 14 for the reception of a wire-handle 15 in the form of a loop.

In assembling the reel, the disks 7 and 8 are first applied to the ends of the spool 2 after which the washers 9 are applied to the outer faces of the disks. The strap 13 is then passed downward through the slot 11 of the upper washer 9 into the hole 3 of the spool 2, until the loop 14 of the strap is brought to a bearing upon the said upper washer at points alongside the slot 11. The lower ends of the strap pass thence downward through the hole 3 and through the slot 11 in the lower washer 9 and are then bent outward at right angles in opposite directions to form retaining-fingers 16. The strap itself is slightly wider than the diameter of the said hole 3 so that the edges of the strap are crowded into the walls of the hole at opposite points therein as shown in Fig. 7, whereby the strap is prevented from rotating with respect to the spool. The upper and lower disks 7 and 8 are formed, as shown, with central, circular openings 17 slightly larger in diameter, by preference, than the central hole 3 of the spool. When the parts are assembled, as described, the inwardly extending positioning fingers 12 of the respective washers, pass through the holes 17 in the disks, as shown in Fig. 3, and form abutments, as it were, for the edges of the said openings 17, whereby the disks are positioned and centered and prevented from lateral displacement in the direction of the said fingers as well as prevented from lateral displacement in the opposite direction by the engagement of the edges of the holes 17 with the edges of the strap 13. Under this arrangement, the soft inner edges of the disks are prevented from being cut and worn, and the life of the reel prolonged and its appearance preserved. The outer edges of the disks, as shown, are united by means of metal clips 18 which may be of any approved construction.

I claim—

In a reel for strip material, the combination with a spool having a central hole, of relatively large disks applied to the respective ends of the spool and formed with central openings concentric with the hole in the spool, washers concentrically applied to the outer faces of the respective disks and each formed with a handle-slot, and with a pair of positioning-fingers extending into the central openings of the disks and forming abutments for centering the same, a handle-strap passing through the spool and through slots of the respective washers for binding them together, and a handle applied to one end of the said strap.

In testimony whereof, I have signed this specification in the presence of two subscribing witnesses.

JOHN J. BUCHANAN.

Witnesses:
W. T. BROUSON,
DARRAGH DE LANCEY.

Copies of this patent may be obtained for five cents each, by addressing the "Commissioner of Patents, Washington, D. C."